(12) United States Patent
Scarpino et al.

(10) Patent No.: US 8,199,834 B2
(45) Date of Patent: Jun. 12, 2012

(54) FRAME DECIMATION THROUGH FRAME SIMPLIFICATION

(75) Inventors: Frank Scarpino, Centerville, OH (US); Eric Balster, Kettering, OH (US); Thaddeus Marrara, Morgantown, WV (US)

(73) Assignee: University of Dayton, Dayton, OH (US)

( * ) Notice: Subject to any disclaimer, the term of this patent is extended or adjusted under 35 U.S.C. 154(b) by 903 days.

(21) Appl. No.: 12/159,895

(22) PCT Filed: Dec. 20, 2006

(86) PCT No.: PCT/US2006/048966
§ 371 (c)(1),
(2), (4) Date: Oct. 22, 2008

(87) PCT Pub. No.: WO2007/081537
PCT Pub. Date: Jul. 19, 2007

(65) Prior Publication Data
US 2010/0014586 A1    Jan. 21, 2010

Related U.S. Application Data

(60) Provisional application No. 60/756,160, filed on Jan. 4, 2006.

(51) Int. Cl.
*H04N 11/02* (2006.01)
(52) U.S. Cl. ........... 375/240.29; 375/240.01; 375/240.1; 375/240.11; 375/240.12; 375/240.13; 375/240.14; 375/240.15
(58) Field of Classification Search .......... 375/240–254; 382/232–253
See application file for complete search history.

(56) References Cited

U.S. PATENT DOCUMENTS

| 4,706,260 A * | 11/1987 | Fedele et al. ................. 375/245 |
| 6,480,541 B1 * | 11/2002 | Girod et al. ............. 375/240.12 |
| 2006/0104350 A1 * | 5/2006 | Liu ......................... 375/240.03 |

FOREIGN PATENT DOCUMENTS

JP    11-177986    *    7/1999

OTHER PUBLICATIONS

Adaptive temporal decimation for video compression algorithms by Bjorn Olstad; Published by SPIE and IS&T; Year: 1993.*

* cited by examiner

*Primary Examiner* — Taghi Arani
*Assistant Examiner* — Madhuri Herzog
(74) *Attorney, Agent, or Firm* — Dinsmore & Shohl LLP

(57) ABSTRACT

System and method of providing improved signal compression using frame decimation through frame simplification and generating an encoded bitstream of video frames therefrom are disclosed. The encoding method comprises zeroing a difference frame generated by an encoder by using a feedback loop that injects a reconstructed frame, generated by the encoder of the difference frame, as a next frame of the video frames to be processed by the encoder. The encoding system comprises an input configured to provide a stream of video frames; a first process configured to generate a difference frame, and a second process configured to generate a reconstructed frame. A feedback loop of the system is configured to inject a generated reconstructed frame from the second process of a generated difference frame from the first process as a next frame of the video frames in the stream to be processed into the encoded bitstream by the encoding system.

20 Claims, 9 Drawing Sheets

FRAME DECIMATION THROUGH FRAME SIMPLIFICATION

The present invention relates to signal processing, and in particular to a system and method of providing improved signal compression using frame decimation through frame simplification.

MPEG is a term that refers to the family of digital video compression standards and file formats developed by the Moving Picture Experts Group (MPEG). The MPEG file formats provide very high compression rate of digital video by storing only the changes from one frame to another, instead of each entire frame. The video information is then encoded using a discrete cosine transform (DCT) process, which although removes some data, such data removal is generally imperceptible to the human eye.

There are three major MPEG standards: MPEG-1, MPEG-2 and MPEG-4. The most common implementations of the MPEG-1 standard provide a video resolution of 352-by-240 at 30 frames per second (fps), and are optimized for T1/E1 speeds, single programs in a stream, and progressive scanning. The MPEG-1 format produces video quality slightly below the quality of conventional VCR videos. MPEG-1 audio provides CD-ROM-quality stereo sound. MPEG-2 offers resolutions of 720×480 and 1280×720 at 60 fps, and 1920×1080 at 30 fps, with full CD-quality audio. This is sufficient for all major TV standards, including NTSC and HDTV. The MPEG-2 format supports higher speeds, multiple programs in a single stream, and interlaced as well as progressive images, and data transmission. MPEG-2 audio supports MPEG-1 audio and has options for lower-quality sound, such as secondary audio channels for television broadcast. MPEG-4 is a graphics and video compression algorithm standard that is based on MPEG-1 and MPEG-2 and Apple QuickTime technology. MPEG-4 files are smaller than JPEG or QuickTime files, so they are designed to transmit video and images over a narrower bandwidth and can mix video with text, graphics and 2-D and 3-D animation layers. The MPEG-4 format is designed for DS0 audio/video, such as MIME messages.

Progressive scanning is the term applied to a particular method of monitor display. In progressive scanning, the first line is displayed on the monitor, then the second, then the third, and so forth until the frame is completely painted. Intuitively, this process is very simple. The advantage of progressive scanning is that it is relatively simple to compress a single frame. For any pixel at a particular location, there is a high probability that all eight contiguous pixels have the same value. This information is used when compressing a single frame (spatial compression). Progressive scanning is also used for videoconferencing, computer monitors, and motion pictures. MPEG-1 was designed for use by progressively scanned media, such as CD-ROM.

Interlacing is the term applied to a particular method of displaying the odd-numbered lines in a picture frame first. After all the odd-numbered lines are displayed, the even numbered-lines are displayed. This technique takes advantage of the fact that the human eye cannot discern flicker at $\frac{1}{30}$th of a second, and do not need every line painted. Interlacing reduces by half the frequency by which frames are painted. The problem with interleaving is that it is more difficult to compress spatially. For any pixel at a particular position, only the pixels before and after on the same line are to be displayed within the scan rate of $\frac{1}{30}$th of a second. The other six pixels will be displayed $\frac{1}{30}$th of a second later. So normal spatial compression algorithms are a bit more complicated. MPEG-2 is designed, among other things, for compression of interlaced displays, and supports both interlaced and progressive scan video streams. In progressive scan streams, the basic unit of encoding is a frame; in interlaced streams, the basic unit may be either a field or a frame. In the discussion below, the generic terms "picture" and "image" refer to either fields or frames, depending on the type of stream.

MPEG-2 provides interframe compression, called temporal compression. To achieve temporal compression, some frames are computed from other frames. The technique is to define three different kinds of frames. First there are Intraframes or I-Frames. Next there are Predicted frames or P-Frames. These are predicted from I-Frames or other P-Frames. Finally, there are Bidirectional frames or B-Frames. B-Frames are interpolated from I and/or P-Frames. An example of a common temporal compression process is described hereafter.

FIG. 1 illustrates a simplified video coding system 100. The system includes an encoder 102 provided in communication with a decoder 104 over a channel 106. The encoder 102 receives original video data at an input. It generates coded video data from the original video data and outputs the coded video data to the channel 106. The channel 106 may be a communication link, such as those provided by telecommunications networks or computer networks, or may be a memory such as an optical, electric or magnetic storage device. The decoder 104 retrieves the coded video data from the channel 106 and, by inverting the coding process performed by the encoder 102, reconstructs the original video data therefrom. Depending upon the coding/decoding techniques used, the reconstructed video data may be either an exact replica or merely a close approximation of the original video data.

Coded video data consumes less bandwidth than uncoded video data. Encoders employ coding techniques that exploit redundancy in the uncoded video data. A variety of coding techniques are known; they vary in terms of bandwidth conservation and computational complexity imposed upon the encoder and/or decoder.

One type of known video coder is the "predictive coder." In a predictive coder, coded video data at one time may be coded using video data at another time as a reference. As is known, predictive coders may code input video data on a block basis. In one application, the video image is separated into one luminance (Y) and two chrominance channels (also called color difference signals Cb and Cr). Blocks of the luminance and chrominance arrays are organized into "macroblocks", which are the basic unit of coding within a picture. Each macroblock is divided into four 8×8 luminance blocks. The number of 8×8 chrominance blocks per macroblock depends on the chrominance format of the source image. For example, in the common 4:2:0 format, there is one chrominance block per macroblock for each of the two chrominance channels, making a total of six blocks per macroblock, and in the common 4:2:2 format, there are two chrominance block per macroblock for each of the two chrominance channels, making a total of eight blocks per macroblock.

FIG. 2 is a block diagram of a common encoding architecture 200, such as provided by encoder 102. An uncompressed video frame 202 is inputted to the encoder, wherein P and B pictures are first subjected to a process of motion estimation 204 and motion compensation 206, in which they are predicted from the previous (and in the case of B pictures, the next) image in time order. Motion estimation is the process of finding optimal or near-optimal motion vectors. The amount of prediction error for a block is often measured using the mean squared error (MSE) or sum-of-absolute-differences (SAD) between the predicted and actual pixel values over all pixels of the motion-compensated region. Motion compensation is the process of dividing up the current frame into non-overlapping blocks, and the motion compensation vector tells where those blocks come. The source blocks typically overlap in the source frame. Some video compression algorithms assemble the current frame out of pieces of several different previously-transmitted frames. The I-Frame (usually the first) is encoded just as a normal image without motion estimation or motion compensation.

By the motion estimation 204 and motion compensation 206 processes, each macroblock in the P or B picture is associated with an area in the previous or next image that is well-correlated with it, as selected by the encoder using a motion vector. The motion vector that maps the macroblock to its correlated area is encoded, and then the difference 208, using a reference frame reconstructed via reverse quantization and reconstruction processes 210 and 212, respectively, between the two areas is passed through the encoding process described below.

In the transform and block quantization process 214, each block is treated with an 8×8 discrete cosine transform (DCT). The basic scheme is to predict motion from frame to frame in the temporal direction, and then to use DCT's (discrete cosine transforms) to organize the redundancy in the spatial directions. The DCT's are done on 8×8 blocks, and the motion prediction is done in the luminance (Y) channel on 16×16 blocks. In other words, given the 16×16 block in the current frame being encoded, a close match to that block in a previous or future frame (there are backward prediction modes where later frames are sent first to allow interpolating between frames) is found. The DCT coefficients (of either the actual data, or the difference between the current block and the close match) are "quantized", which means they are divided by some value to drop bits off the bottom end, such that many of the coefficients will then end up being zero. The quantization can change for every "macroblock" (a macroblock is 16×16 of Y and the corresponding 8×8's in both U and V). The results of all of this, which include the DCT coefficients, the motion vectors, and the quantization parameters (and other variables) is encoded using an encoding algorithm 216, such as an entropy encoding algorithm used for lossless data compression, i.e., Huffman coding. The encode signal is then buffered 218 and transmitted, such as to the decoder 104 via channel 106.

The DCT coefficients have a special Huffman table that is "two-dimensional" in that one code specifies a run-length of zeros and the non-zero value that ended the run. Also, the motion vectors and the DC DCT components are DPCM (subtracted from the last one) coded. The resulting DCT coefficients are then quantized, re-ordered to maximize the probability of long runs of zeros and low amplitudes of subsequent values, and then run-length coded.

I pictures encode for spatial redundancy, P and B pictures for temporal redundancy. Because adjacent frames in a video stream are often well-correlated, P pictures may be 10% of the size of I pictures, and B pictures 2% of their size. For B-Frames, matching blocks are searched in those frames by three different methods to see which works best. The process uses the forward vector, the backward vector, and then averages the two blocks from the future and past frames, and subtracts the average from the block being coded. If none of those work well, the block is intracoded. An intracoded frame relies on information on previous and/or future intracoded frames to reconstruct itself.

The sequence of different frame types is called the Group of Pictures (GOP) structure. The encoder 102 sends an I-Frame. Then a P-Frame is sent, perhaps 100 ms later. The time interval is set by configuration. The decoder 104 cannot display the two pictures consecutively, because a 100-ms gap would not provide a smooth picture, therefore, the pictures in between (the B-Frames) are computed (interpolated) from I and P-Frames. The sequence of frames in a video may be similar to the following:

| Time (ms) | Frame |
| --- | --- |
| 0 | I |
| 33.33 ... | B |
| 66.66 ... | B |
| 99.99 ... | P |
| 133.33 ... | B |
| 166.66 ... | B |
| 199.99 ... | P |
| 233.33 ... | B |
| 266.66 ... | B |
| 299.99 ... | P |
| 333.33 ... | B |
| 366.66 ... | B |
| 399.99 ... | I |
| Repeat ... | |

This example is for illustration purposes only. By convention, I-Frames are sent roughly every 400 ms. Also by convention, there are generally 10 to 12 frames between I-Frames. The mix of B-Frames and P-Frames is variable. Some users have elected not to use B-Frames at all but to use more P-Frames instead. There are many possible structures but a common one is 15 frames long, and has the sequence I_BB_P_BB_P_BB_P_BB_P_BB_. The similar 12-frame sequence shown above is also common.

The ratio of 1, P, and B pictures in the GOP structure is determined by the nature of the video stream and the bandwidth constraints on the output stream, although encoding time may also be an issue. This is particularly true in live transmission and in real-time environments with limited computing resources, as a stream containing many B pictures can take three times longer to encode than an I-picture-only file. B-Frames tend to make pictures smoother on playback while consuming less bandwidth. I-Frames anchor picture quality, because ultimately P and B-Frames are derived from them. Therefore, I-Frames should be transmitted with higher reliability than P or B-Frames.

It is against the above background that the present invention provides a method to modify standard video encoders. The modification allows for a reduction in the frame rate of the video signal. This reduction has at least two benefits. First, the reduction in the frame rate produces an overall compression benefit by reducing the number of frames to be compressed, thus reducing the amount of data to be compressed. Second, this inherent reduction in data can allow for higher data rates for each frame to be compressed, increasing the fidelity of individual frames.

In general, the present invention is useful in any device having an encoder/decoder where the bitrate is used to adjust the quality of a video. The present invention is also noted as being useful in the following specific implementations.

Digital TV/HDTV—the present invention can be used to either add additional channels to existing systems or reduce the overall bandwidth requirements. Adding an additional channel according to the present invention would consist of decimating enough frames from the previous existing channels to provide the needed bandwidth for a new channel. Also for digital progressive video the overall bandwidth can be reduced by the present invention without seriously impacting video quality. These formats include 480p, 720p, and 1080p, which all have frame rates of 60 frames per second.

Satellite News Feed—The present invention can improve the current state of satellite technology providing live news feeds from overseas, which presently can be exceedingly low quality given the prohibitive cost of satellite time and low bandwidth. By using the invention to decimate the video, improvements in the overall quality of the video feed can be provided while maintaining existing bandwidth requirements.

Cell Phones/Media Players—Given the push for video on cell phones, and other portable media players, the present invention allows video to be viewed by reducing the bandwidth requirement of the video while maintaining or improving video quality.

Video Surveillance—By frame decimation according to the present invention, spatial resolution of the video is improved, thereby allowing for greater video details to be captured for surveillance purposes.

Teleconferencing—For lower bitrate teleconferencing, the spatial video resolution can be increased by using the present invention, thus allowing for greater clarity.

Internet Video—The present invention also enables the reduction of the bitrate/file size of video streams or video files on the Internet, thereby reducing the time to download the video, and allowing for faster downloads and earlier viewing.

The present invention addresses the issue of reducing video bandwidth and/or improving video quality by increasing spatial resolution. The need for reducing the bandwidth of video information is increasingly significant because of a seemingly limitless growth of multimedia consumption and demand. The less bandwidth that is used, the cheaper and quicker video can be disseminated. In addition, this method can be used to improve video quality of a given system.

An additional noted benefit of the decimation method of the present invention is that the resultant bitstream exiting the system is the same standard as the initial bitstream entering the system. For instance an MPEG-2 NTSC bitstream remains an MPEG-2 NTSC bitstream after this method is applied. Therefore, according to the present invention, modifications are only implemented when compressing the video signal, wherein the decompressing of the video is left unchanged. This benefit is of great value to communications systems with one source and many viewers already in place, such as broadcast communications systems. Since many more video decoders are in use than encoders, the present invention's cost/benefit ratio over a proprietary video stream is excellent. In essence the invention adds an additional degree of freedom when selecting between video quality and bitrate, thereby yielding greater flexibility for video data.

In one embodiment, a method of eliminating frames in an encoder generating an encoded bitstream of video frames is disclosed. The method comprises zeroing a difference frame using a feedback loop that injects a reconstructed frame of the difference frame as a next frame of the video frames to be processed by an encoding system.

In another embodiment, an encoding system outputting an encoded bitstream of video frames is disclosed. The encoding system comprises an input configured to provide a stream of video frames, a first process configured to generate a difference frame, and a second process configured to generate a reconstructed frame. A feedback loop of the system is configured to inject a generated reconstructed frame from the second process of a generated difference frame from the first process as a next frame of the video frames in the stream to be processed into the encoded bitstream by the encoding system.

These and other features and advantages of the invention will be more fully understood from the following description of various embodiments of the invention taken together with the accompanying drawings.

Figure 1:
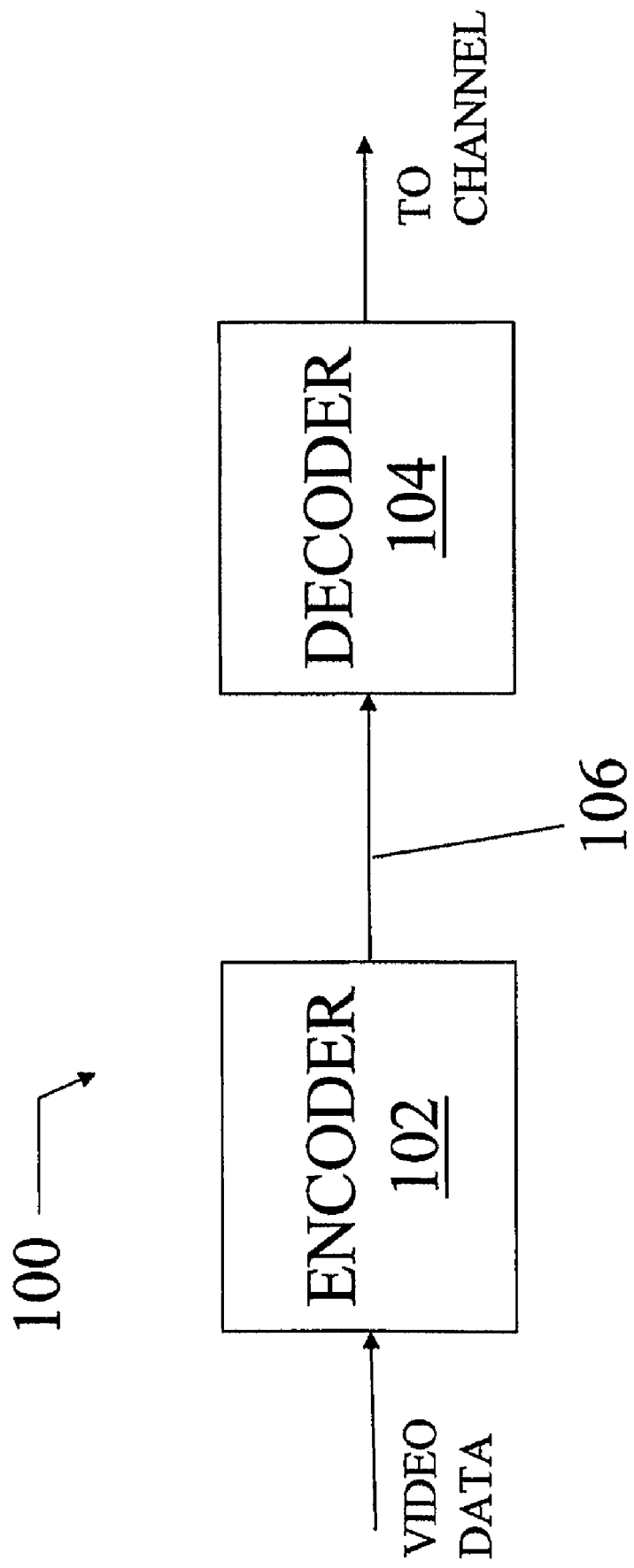
FIG. 1 is a block diagram of a conventional video coding/decoding system.
Figure 2:
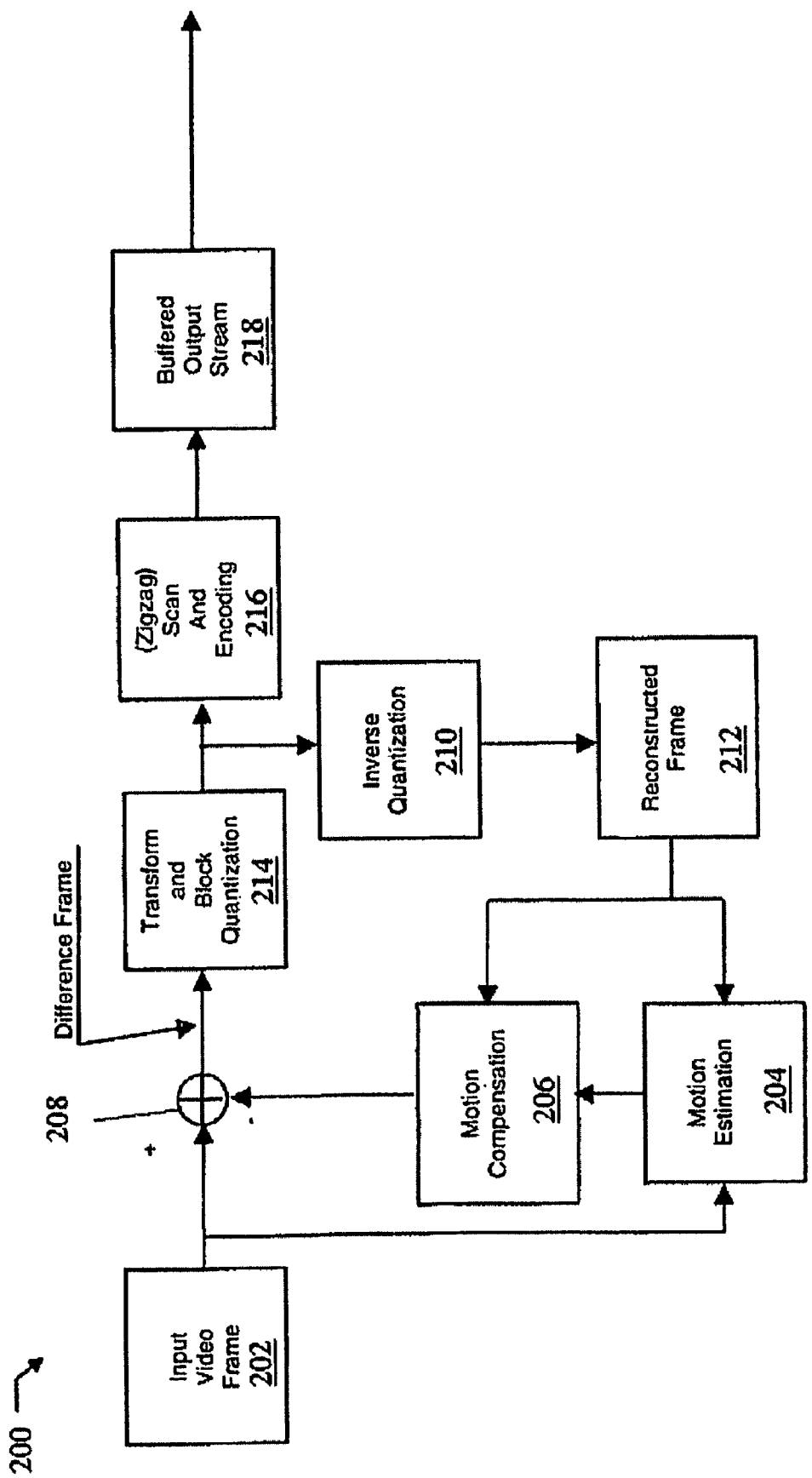
FIG. 2 is a block diagram of a conventional encoding system used in the system of FIG. 1.

In general, the present invention can be used to modify any video compression system, such as system 100 in FIG. 1, which uses predicted frames (P-Frames) and/or bidirectional (B-Frames) as part of the bitstream, where a P-Frame contains the changes that have occurred since the previous frame, and B-Frames uses data from both the previous intra-frame (I-Frame)/P-Frame and the P-Frame which will come after the B-Frame being calculated. In particular, the present invention is an apparatus and method which deceives a compression system, such as for example, the type of compression or encoding system 200 illustrate by FIG. 2, into decimating frames (P-Frames and/or B-Frames) by merely manipulating the video input sequence. The present invention avoids several difficulties associated with video decimation, as well as introduces the novel benefit of remaining backwards compatible with existing encoders. An illustrative encoding system embodiment showing an implementation of frame decimation through frame simplification according to the present invention is described hereafter with reference to FIG. 3.

Encoding System

Figure 3:
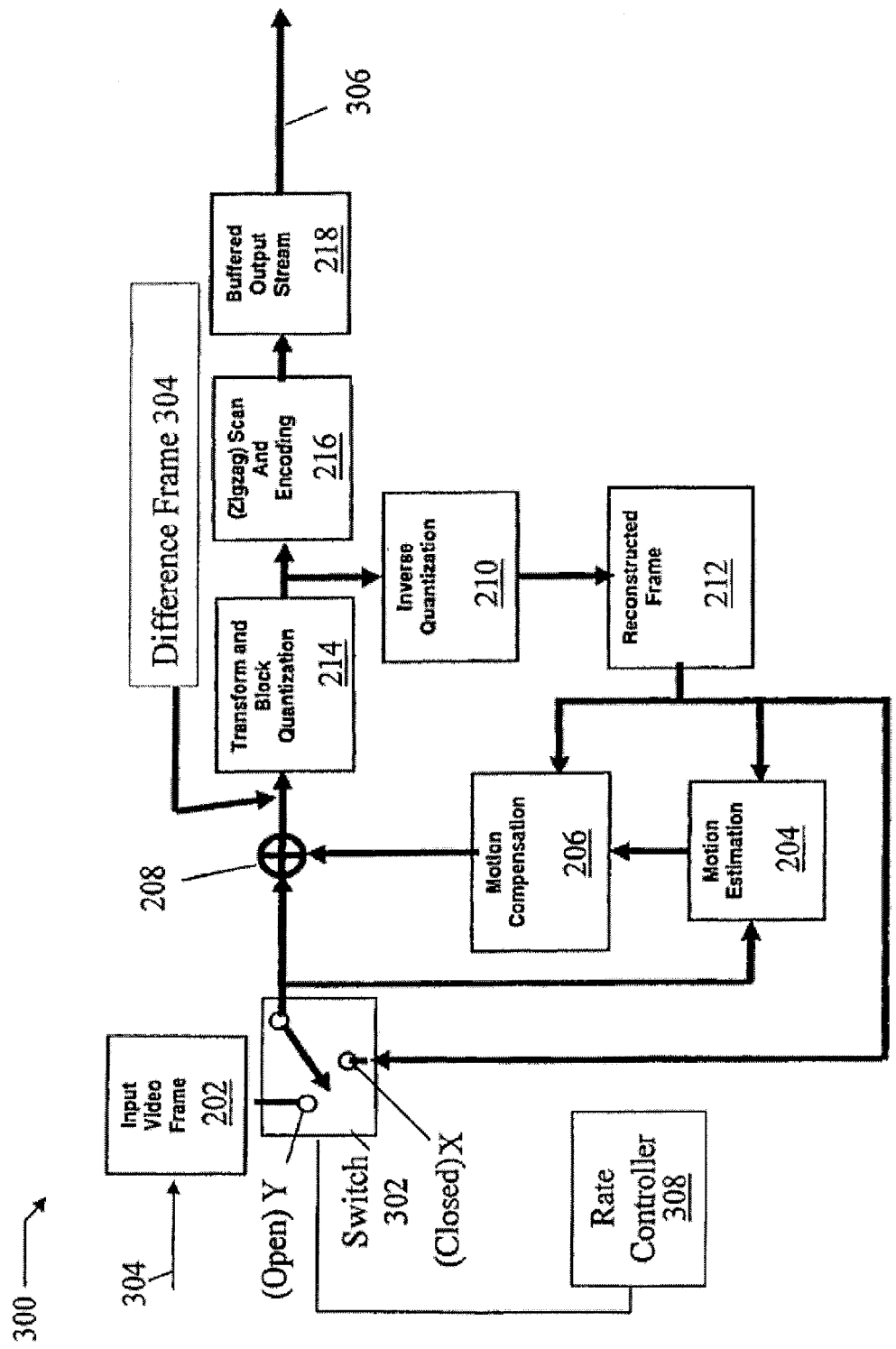
FIG. 3 is a block diagram of an encoding system according to the present; invention suitable for use in the video coding/decoding system of FIG. 1.

FIG. 3 is a block diagram that illustrates processing of an encoding system 300 that may be performed by an encoder, such as encoder 100, modified according to the present invention, to code video data predicatively. As shown in FIG. 3, the encoding system 300 of the present invention includes all the same functional components 204, 206, 208, 210, 212, 214, 216, and 218 of the system 200 of FIG. 2, except for the addition of a switch 302 and a rate controller 308, which controls switching of switch 302. The encoding system 300 induces, via switch 302 and rate controller 308, the functional components 204, 206, 208, 210, 212, 214, 216, and 218 to produce frame decimation each time that the feedback loop is closed (i.e., switch in position X) that injects a reconstructed frame 212 into the system as the next frame to be processed. When the feedback loop is closed (i.e., set to position X), the difference frame 304 will be a "zero-frame" and the encoding system 300 will produce a natural-decimation. In other embodiments, any implementation that zeros the difference frame 304, which includes the sum of differences and the motion vectors, to produce such decimation may be used.

P-Frame Decimation

For example, to highlight the present invention, three explanatory embodiments of P-frame decimation according to the present invention are discussed. In the first embodiment, the video quality is held constant. By decimating an inputted video stream, or video file, 304 by a single frame, the video bitrate is reduced by the elimination of the content of that particular frame. Increasing the decimation performed on the video stream or video file, will ultimately then yield a greater reduction in the final bitrate of an encoded bitstream 306 of video frames outputted from the system 300.

Figure 4:
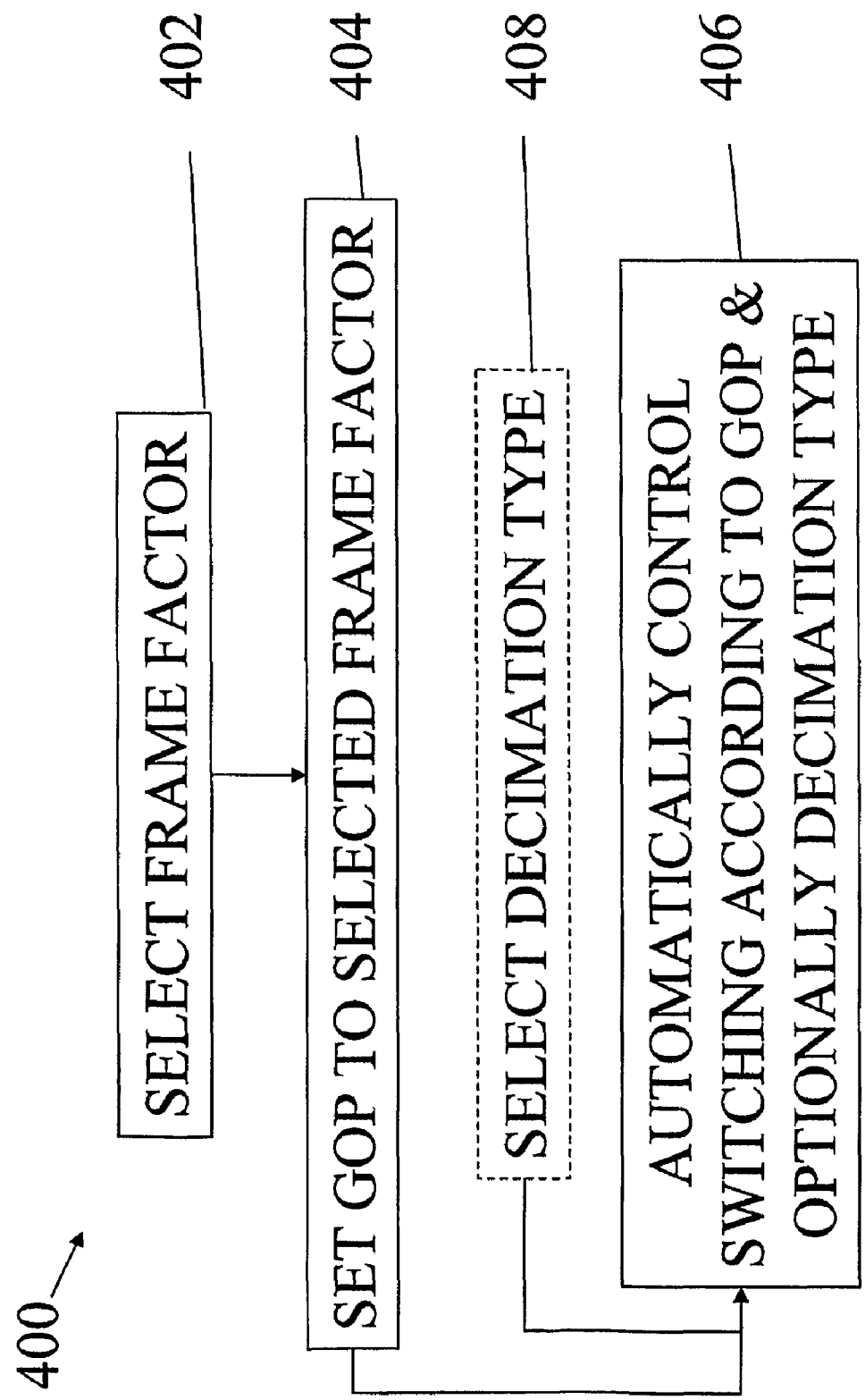
FIG. 4 is a process flow of a method to select a desired frame fraction according to the present invention.
Figure 5:
FIGS. 5-8 provide comparisons each showing that video quality is improved using the frame decimation method according to the present invention.
Figure 5:
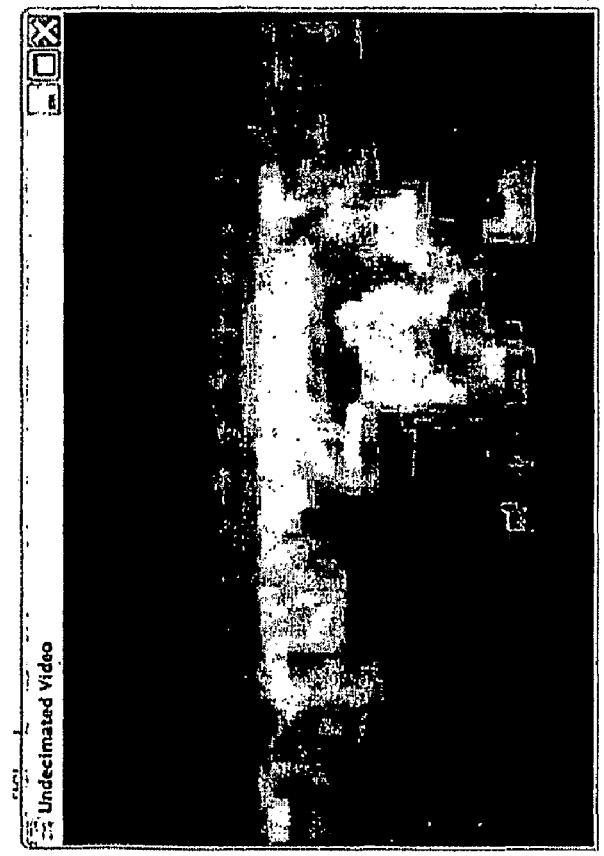
Figure 6:
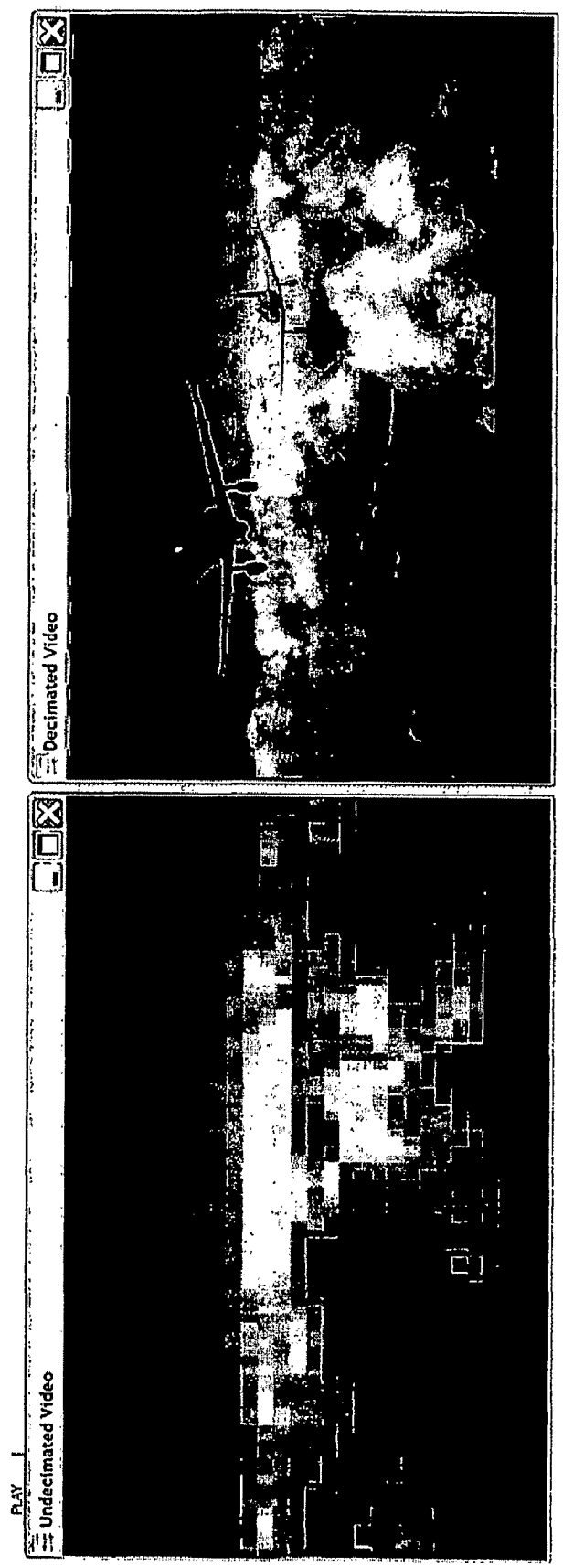
Figure 7:
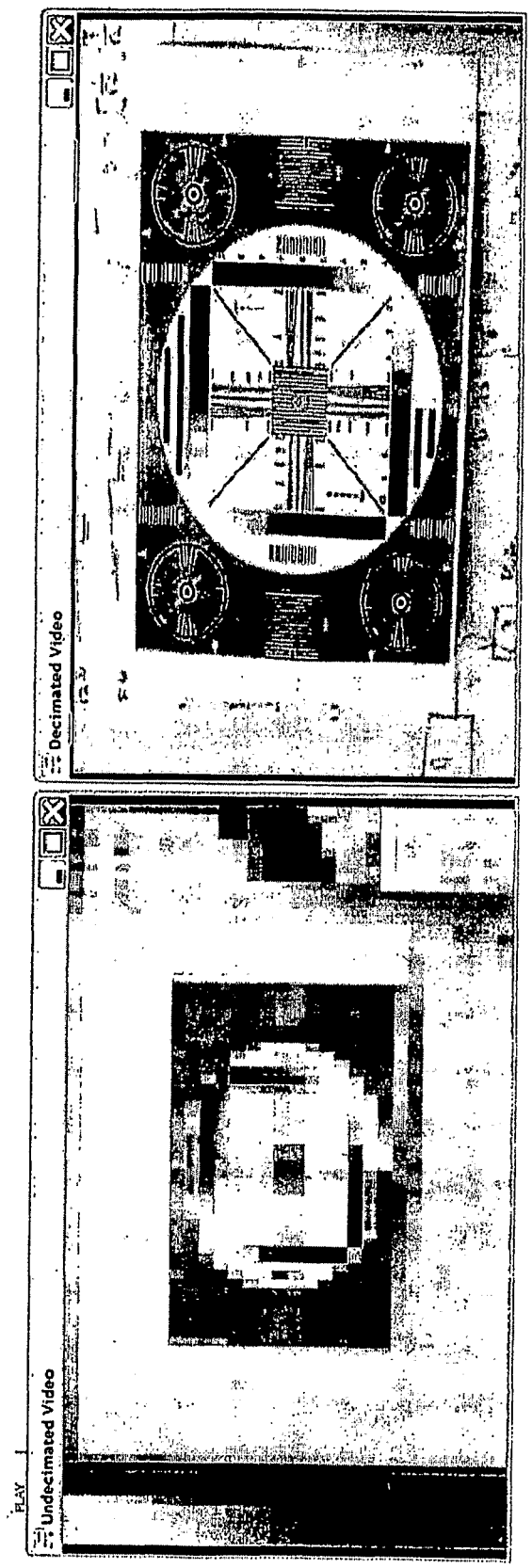
Figure 8:
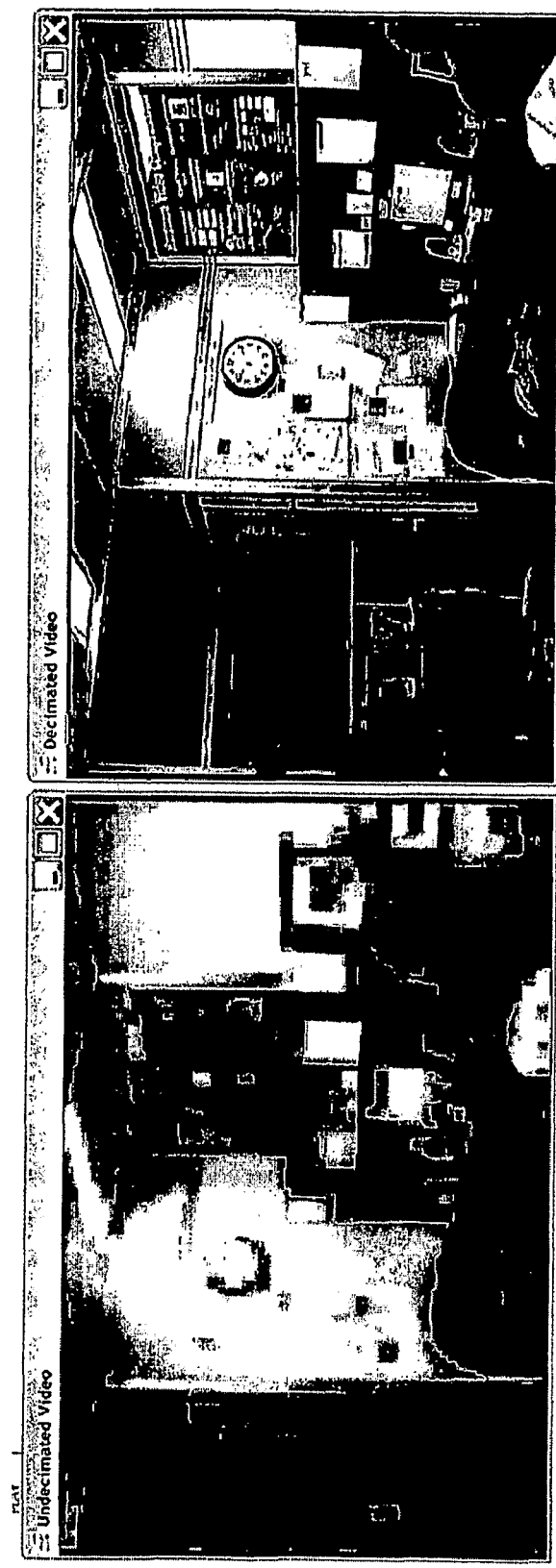

For this first embodiment and with reference made also to a control method of FIG. 4 according to the present invention, in a first step 402, a frame factor for frame decimation is selected. It is to be appreciated that the rate controller 308, which is aware of the method 400, accepts as input the desired frame factor. The frame factor is a range of selectable numbers. For example, if frame decimation is selected to be by a factor of two, then in a second step 404 the GOP of the system 300 is set to two in the rate controller 308. Next, in step 406, the switch 302 is then controlled automatically by the rate controller 308 to switch state, i.e., switched between position Y (open) to position X (closed), according to the selected frame factor for the GOP, which in this example, is every other frame. Accordingly, in this example, one new video frame 202 and then one reconstructed feedback frame 212 is inputted into to the encoder system 300. This process is then repeated for the entire sequence of the inputted video stream 304. This frame simplification results in the encoded bitstream 306 including half as many P-Frames than that in a conventional encoded bitstream outputted from the encoding system 200 shown in FIG. 2, without switching according to the present invention.

In the second embodiment, the bitrate is held constant. Decimating the inputted video stream 304 by a single frame will result in a quality increase of the output video. The more decimation that is performed on the video stream 304 then the greater the increase in spatial resolution of the remaining frames. In the second embodiment, if the frame factor is selected as four in step 402, indicating frame decimation by a factor of four, then in step 404 the GOP is set to four in the rate controller 308. In step 406, then the rate controller 308 controls the switch 302 such that one new video frame 202 and then three reconstructed feedback frames 212 are feed as input into the encoder system 300. This process is repeated for the entire sequence of the inputted video stream 304.

In the third embodiment, the video quality and bitrate are held constant. It is to be appreciated that the video stream 304 can be decimated until both the desired video quality and desired bitrate are achieved. This is now possible because the present invention adds a new degree of freedom to the typical bitrate versus quality equation. In the third embodiment, the encoder system 300 is configured to decimate a 30 frame per second video to 24 frames per second. In this embodiment, the GOP is set to fifteen and the switch 302 is automatically controlled by the rate controller 308 to feed in one I-Frame, and then eleven P-Frames followed by three reconstructed feedback frames 212 in to the encoder system 300. This process is repeated for the entire sequence of the inputted video stream 304. The reconstructed feedback frames can be spaced out over the entire GOP to avoid noticeable jittering.

It is to be appreciated that the spatial resolution is increased by the present invention, and hence video quality is also improved. As mentioned above in the background of the invention, MPEG2 is a very complicated video compression algorithm. However, the effect it has on a video signal is fairly simple to describe. Using MPEG2 compression, one can trade-off spatial resolution for desired bitrate. That is, as the output data rate of an MPEG2 encoder system gets reduced, video picture becomes less detailed. In other words, as the bitrate for an MPEG2 video stream is lowered, the video becomes more blurry, and undesirable artifacts are produced because the MPEG2 compression is straining to fit the content of the video signal into a smaller and smaller data pipe. The lower the output data rate becomes, the more data, or "information", the MPEG2 compression has to throw away. Thus, lower data rate MPEG2 files have less spatial resolution than MPEG2 files of a higher data rate. The effect of frame decimation is to reduce the amount of data that goes into the MPEG2 compressor.

For example, a 10 second video clip running at 30 frames per second is 300 frames large. However, by eliminating every other frame in the sequence, then same 10 second video clip now runs at 15 frames per second or 150 frames. Thus, by frame decimating the video signal, half the data in the video sequence has been eliminated. Because only half of the data is being delivered to the MPEG2 compressor, it will naturally throw away half as much "information" from each frame in the sequence, for a given bitrate. Therefore when comparing the 30 frame per second and 15 frame per second video clips, the 15 frame per second video have higher spatial resolution (higher quality).

Please note that the above example is merely to illustrate the effect of frame decimation, and not the frame decimation method described above. Merely eliminating frames prior to compression would result in the decompressor failing to operate properly. The present invention of frame decimation, however, is transparent to the MPEG2 compression standard. That is, current MPEG2 decoders (or players) are expecting to receive 30 frames per second. The present invention is able to eliminate frames while still being compliant with the compressed format. That is, the present invention deceives the decoder into believing that it continues to receive 30 frames per second (via the inclusion of the zero frames) when in reality it does not, and therefore continues to operate correctly.

FIGS. 5-8 provide comparisons each showing that video quality is improved using system and method 300 and 400 according to the present invention. Video for the side by side comparisons was taken with a bitrate of 1 Megabit per second (1 Mbps), standard NTSC resolution (720×480 pixels), and with MPEG2 compression, which used the 4:2:0 conversion prior to compression. The present invention provided a compression to 7.5 fps of the input video. At 7.5 fps, frame decimation is by a factor of four, setting the GOP of the rate controller 308 to four such that the switch 302 of the present invention is automatically controlled to fed one new video frame and then fed three reconstructed feedback frames as input into the encoder, resulting in four zero frames being included in the encoded bitstream 306 of video frames outputted from the system 300. The results of present invention are clearly shown with the figures designated with the symbol "A" in each of FIGS. 5-8 being undecimated video compressed to 7.5 fps, and the figures designated with the symbol "B" in each of FIGS. 5-8 being the decimated video at 7.5 fps according to the present invention.

B-Frame Decimation

In still another embodiment, the present invention is also useful for B-Frame decimation. Decimating B-Frames utilize the same system and method 300 and 400 as for P-Frame decimation, except the difference is in how the original B or P-Frame is calculated. As mentioned above, a P-Frame is calculated from the previous P-Frame or the I-Frame. Conversely the B-Frame uses data from both the previous I-Frame/P-Frame and the P-Frame which will come after the B-Frame being calculated. Because of these dependencies the B-Frame can be calculated three ways: 1) Using only data from the previous P-Frame or I-Frame, 2) Using data from only the future P-Frame, or 3) Using data from both the previous frame (I-Frame or P-Frame) and the future P-Frame.

Figure 9:
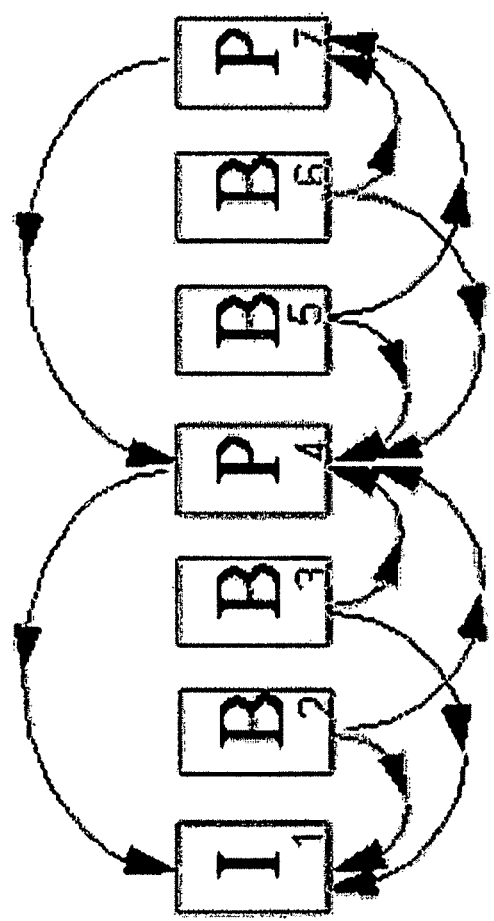
FIG. 9 is a block diagram of a conventional encoded bitstream.

As seen in FIG. 9, the first frame, I-Frame 1, is independently calculated from all other frames. The P-Frame 4 is calculated using only data from the frame I-1, making it predicted from I-1. The B-Frames B-2 and B-3 are calculated using data from both frames I-1 and P-4. This process is repeated for the remaining sequence.

P-Frames are smaller than I-Frames, while B-Frames on average are smaller than both P-Frames. Using B-Frames introduces a delay in processing since the future P-Frame will have be obtained before it can be used. And B-Frames are more computationally intensive to derive than P-Frames.

Figure 10:
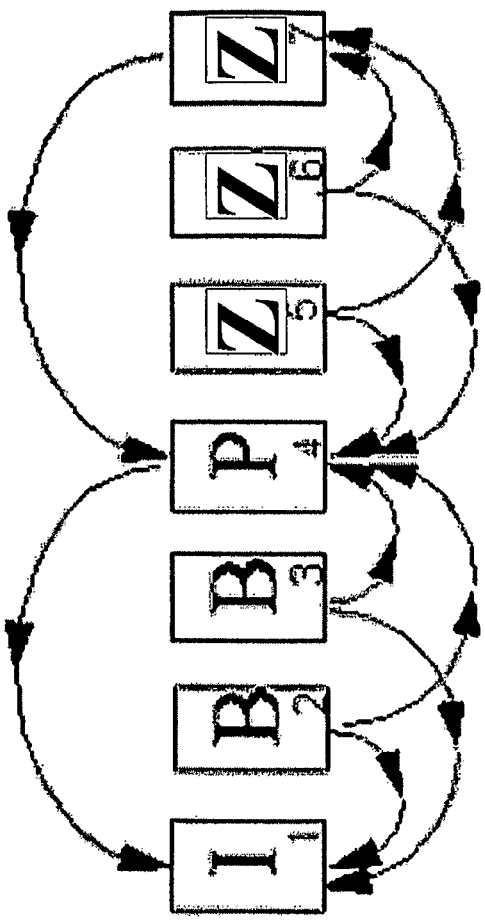
FIG. 10 is a block diagram of one embodiment of an encoded bitstream according to the present invention.

Decimating B-Frames, as stated before, would utilize the exact same method, zeroing out information stored in the B-Frame. For example, in optional step 408, input into the rate controller 308 can be a selection of decimation type, either P-Frames, B-Frames, or both. For a B-Frame decimation selection, instead of using data from the future P-Frame and past I or P-Frame, the data can be removed from the output video stream to induce a visually perceived decimated effect while still maintaining the original frames per second. For example, in FIG. 10, the method of the present invention by selecting both P-Frame and B-Frame decimation, inserts zero frames 5-7 (represented by the symbol Z) for two B-frames and one predictive frame as compared to the non-decimated video stream of FIG. 9. Although FIG. 10 is only an example, it is to be appreciated, that care must be taken when decimating P-Frames since this process will affect the B-Frames as well.

A major difference between the present invention and prior art is the fact that this method removes a portion of the data in the compressed video stream while allowing the compressed video stream to remain standard. The ability to improve quality and/or reduce bitrate, while remaining within the given video standard, has significant impact across the entire video industry. The limitations of this method, however, lie in the fact that it is for use only for compression systems which produce P and/or B-Frames. If no P and/or B-Frames, exist then this solution will of course not be feasible.

Throughout this discussion, reference has been made to "I-Frames," "P-Frames," "B-Frames," "blocks," and "macroblocks." Such nomenclature may be found in certain video coding standards. It is used for illustrative purposes only and not meant to limit the scope of the present invention to any coding standard or family of standards. The embodiments of the present invention herein described are applicable to predictive coders generally, not to any specific type of predictive coder. As exemplary predictive coders, the present invention may be applied to encoders operating in conformance with one or more of the following compression standards: MPEG-1, MPEG-2, MPEG-4, H.261, H.263, H.264, DIVX, XVID, and their successors.

Accordingly, video data may be coded in items based on video frames, video objects or other structures as may be conventional to the predictive techniques used by the encoders of the prior art. Additionally, the intra-coding and inter-coding techniques (with or without a residual) that are performed may be performed on units of data such as blocks, macro-blocks or other organizational units of video data as may be known. "Block," as used herein, is used in a generic sense and is meant to encompass all of these organizational units of input video data. Such variances among coding techniques, items and units are consistent with the scope and spirit of the present invention.

The above description and drawings are only to be considered illustrative of exemplary embodiments, which achieve the features and advantages of the present invention. Modification and substitutions to the present invention can be made without departing from the spirit and scope of the present invention. Accordingly, the invention is not to be considered as being limited by the foregoing description and drawings.

The invention claimed is:

1. A method providing improved signal compression using, frame decimation through frame simplification, said method comprising:
   receiving a stream of video frames;
   generating a difference frame by an encoding process;
   injecting a reconstructed frame generated by the encoding process using said difference frame as a next frame of said video frames using a feedback loop, to be processed by the encoding process; and
   generating, by the encoding process, a decimated frame by zeroing said difference frame by performing a subtraction between said reconstructed frame and said next frame;
   generating, by the encoding process, an encoded bitstream of video frames which includes the decimated frame.

2. The method of claim 1 wherein frames to be decimated are predicted frames.

3. The method of claim 1 wherein frames to be decimated are bidirectional frames.

4. The method of claim 1 wherein frames to be decimated are both predicted and bidirectional frames.

5. The method of claim 1, further comprising selecting a type of frames to be decimated, said types selected from predicted frames, bidirectional frames, and both predicted and bidirectional frames.

6. The method of claim 1 wherein said difference frame includes a sum of differences of motion vectors between frames inputted into the encoder.

7. The method of claim 1 further comprising inputting a frame factor to set a ratio of frame decimation in a Group of Picture (GOP) structure of said encoded bitstream of video frames.

8. The method of claim 7 wherein said GOP structure includes video frames comprising intra-frames, predicted frames, bidirectional frames, and zero frames, and wherein said zero frames consist of zeroed out image data.

9. The method of claim 7 wherein said frame factor is a range of selectable numbers.

10. The method of claim 1 further comprising decoding said encoded bitstream of video frames with a conventional decoder.

11. An encoding system providing improved signal compression using frame decimation through frame simplification, said encoding system comprising:
    an input configured to provide a stream of video frames;
    a first process configured to generate a difference frame;
    a second process configured to generate a reconstructed frame; and
    a feedback loop configured to inject said reconstructed frame from said second process generated using said difference frame from said first process as a next frame in said stream of video frames to be processed into an encoded bitstream by the encoding system, wherein said first process performs a subtraction between said reconstructed frame and said next frame to generate a decimated frame;
    a third process to generate an encoded bitstream of video frames which includes the decimated frame.

12. The encoding system of claim 11, further comprising a switch configured to disconnect said input from said first process and connect said feedback loop to said first process.

13. The encoding system of claim 11, further comprising a switch configured to disconnect said input from said first process and connect said feedback loop to said first process; and a rate controller configured to control automatically switching of said switch between said input and said feedback loop.

14. The encoding system of claim 11, further comprising a switch configured to disconnect said input from said first process and connect said feedback loop to said first process; and a rate controller configured to control automatically switching of said switch between said input from said first process and said feedback loop, wherein said rate controller is configured to accept as input a frame factor to set a ratio of frame decimation in a Group of Picture (GOP) structure of said encoded bitstream of video frames.

15. The encoding system of claim 11 wherein said reconstructed frame is a predicted frame.

16. The encoding system of claim 11 wherein said reconstructed frame is a bidirectional frames.

17. The encoding system of claim 11, further comprising a switch configured to disconnect said input from said first process and connect said feedback loop to said first process; and a rate controller configured to control automatically switching of said switch between said input from said first process and said feedback loop, and configured to accept as input data indicative of a desired rate of frame decimation.

18. The encoding system of claim 11, wherein said difference frame includes a sum of differences of motion vectors between frames inputted into the encoding system.

19. The encoding system of claim 11, further comprising a switch configured to disconnect said input from said first process and connect said feedback loop to said first process; and a rate controller configured to control automatically switching of said switch between said input from said first process and said feedback loop, wherein said rate controller is configured to accept as input a frame factor to set a ratio of frame decimation in a Group of Picture (GOP) structure of said encoded bitstream of video frames, wherein said GOP structure includes video frames comprising intra-frames, predicted frames, bidirectional frames, and zero frames, and wherein said zero frames consist of zeroed out image data.

20. A communication system comprising a decoder connected to an encoder having an encoding system according to claim 11.

* * * * *